United States Patent Office 3,318,097
Patented May 9, 1967

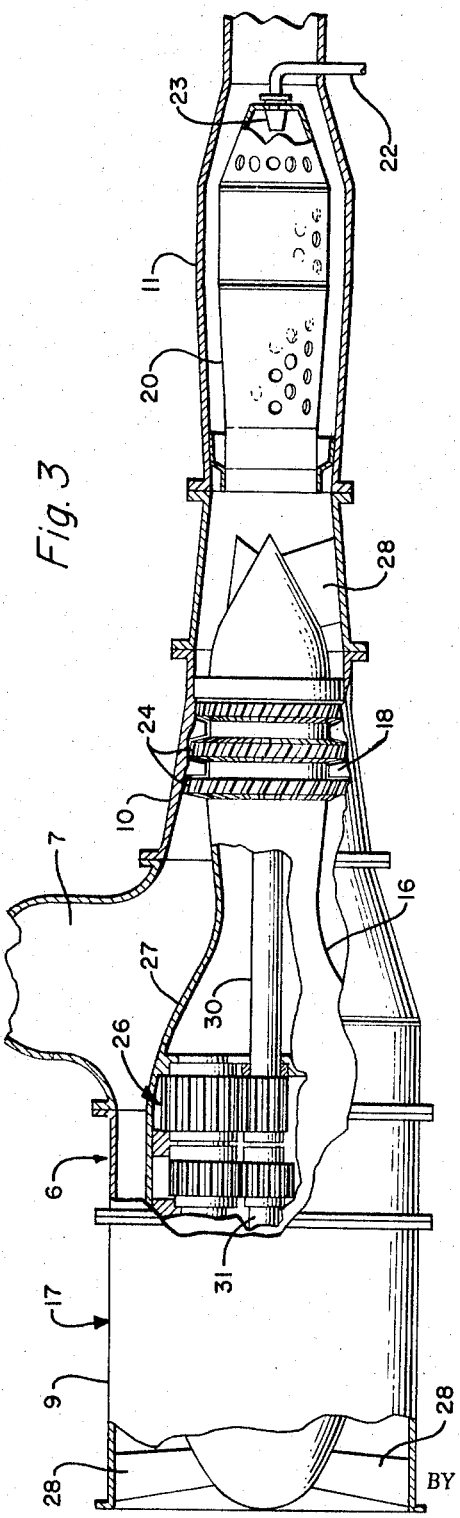

3,318,097
AIR MASS FLOW MULTIPLIER FOR THRUST AUGMENTATION
Palmer R. Wood, Scottsdale, and Frank B. Wallace, Jr., Phoenix, Ariz., assignors to The Garrett Corporation, Los Angeles, Calif., a corporation of California
Filed Oct. 12, 1964, Ser. No. 403,072
15 Claims. (Cl. 60—262)

This invention relates generally to power units for aircraft and is more particularly directed to means for supplying auxiliary power to aircraft of the type adapted for vertical and short takeoff and landing.

Still more particularly, the invention is directed to apparatus for multiplying the mass flow of air from the main aircraft engine to augment the thrust utilized in causing the craft to rise vertically or hover as required by various phases of its mission.

One object of the invention resides in providing apparatus which receives bleed air from the aircraft main turbine engine and multiplies the mass thereof by mixing fuel with the bleed air, burning the fuel-air mixture, expanding the resulting gases in a turbocompressor unit, mixing the air and gases exhausted from the compressor and turbine sections of the unit, and supplying the multiplied fluid mass to a conduit system to be conducted to and discharged from jet nozzles suitably located on the aircraft.

Another object of the invention is to provide an air mass flow multiplying apparatus having a body forming a duct with a bleed air inlet, an atmospheric air inlet, and a turbo-compressor unit in the duct with a combustor for mixing fuel with bleed air and burning the resulting mixture to provide gases to operate the turbine section of the unit, the turbine driving the compressor section to draw air in through the atmospheric air inlet and compress it, the exhausts of the turbine and compressor sections communicating with a conduit system leading to jet nozzles disposed on the aircraft.

Another object of the invention is to provide an air mass flow multiplying apparatus having a body forming a duct with a bleed air inlet at one end, an atmospheric air inlet at the other end, and an outlet between the ends for connection with a distribution system, the duct receiving a turbocompressor unit having the inlet for the turbine portion thereof communicating with the bleed air inlet and the inlet for the compressor portion communicating with the atmospheric air inlet, the outlets of such portions leading to the outlet of the duct.

Still another object of the invention is to provide the apparatus mentioned in the preceding paragraph with a combustor between the turbine portion and the bleed air inlet so that fuel may be mixed with the bleed air and burned to provide gases for use in operating the turbine to drive the compressor, the compressed air and turbine exhaust gases being combined and supplied to a distribution system.

A further object is to provide the apparatus mentioned in the two preceding paragraphs with a speed-changing transmission between the turbine and compressor portions which will permit a compressor of suitable capacity to be most efficiently operated.

A still further object is to provide the apparatus mentioned above with bypass and valve means which will permit the admission of bleed air directly to the distribution system in the event the turbocompressor unit becomes inoperative for any reason.

It is also an object of the invention to so construct the apparatus that the atmospheric air inlet to the duct may be disposed at the outer skin line of the aircraft in which the apparatus is installed, thereby permitting a door to be utilized to close the inlet when the apparatus is not in operation, the door coinciding with and constituting a continuation of the skin line.

Other objects and advantages will be made apparent by the following description of the construction and operation of one embodiment of the invention which has been illustrated in detail in the accompanying drawing.

In the drawing:

FIG. 3 is an axial sectional view of a mass flow multiplying unit formed in accordance with the present invention.

Figure 1:
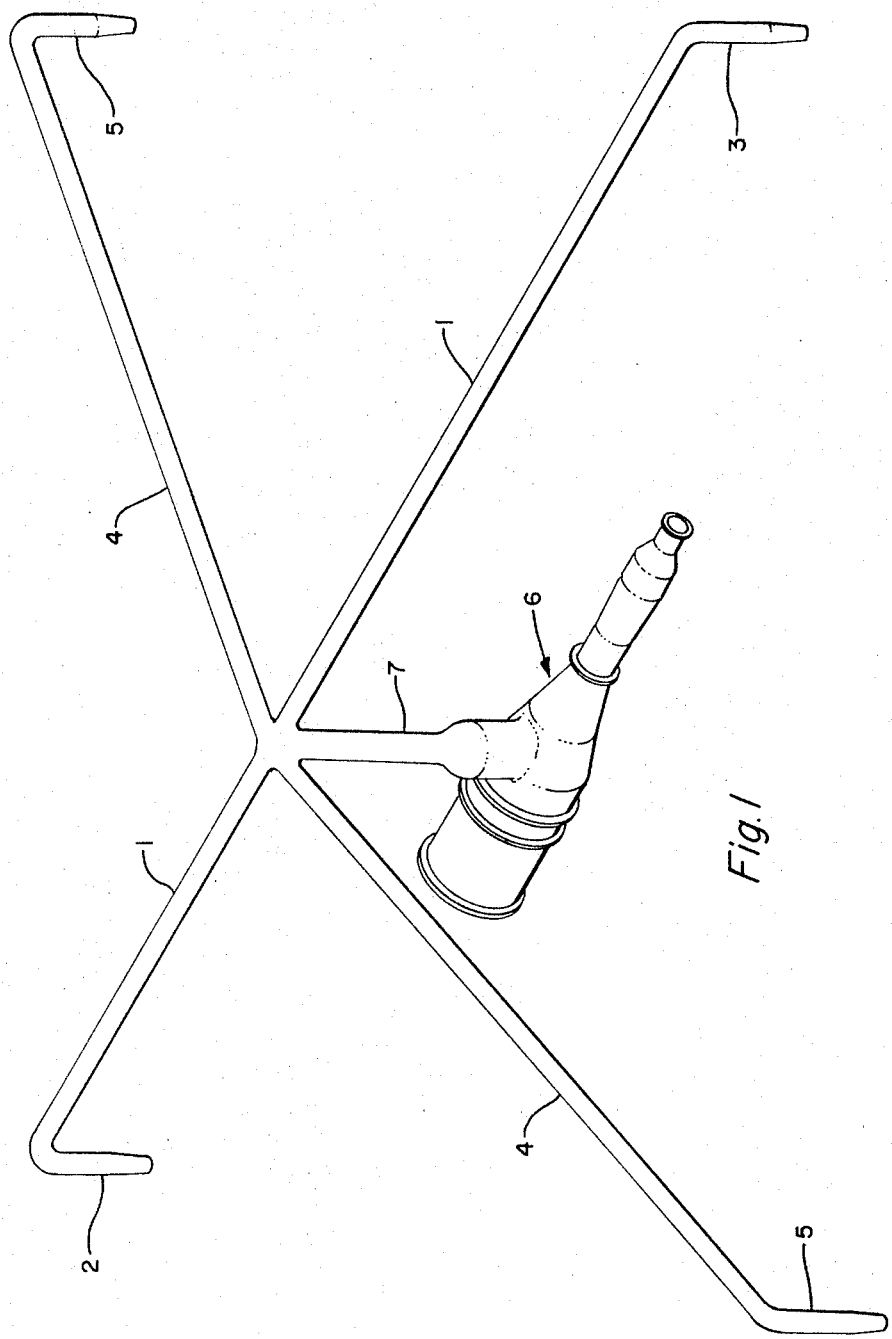
FIG. 1 is a schematic view of an aircraft hover control system to which an air mass flow multiplying apparatus embodying the invention has been applied.

Referring more particularly to the drawings, FIG. 1 shows schematically a hover control system for an aircraft adapted to short takeoff and landing operations. The present invention is directed to an apparatus for supplying air or a combination of air and other gases to the control system shown in FIG. 1.

In the control system, a main duct 1 is provided, this conduit extending axially of the fuselage of the aircraft. At the ends of the conduit there are provided downwardly directed jet nozzles schematically illustrated at 2 and 3. The jet nozzle 2 is arranged near the nose of the aircraft and the jet nozzle 3 adjacent the tail. The system is also provided with branch conduits 4 for communicating with the intermediate portion of the conduit 1 and extending longitudinally of the wings, these branch conduits being provided at their ends with downwardly directed wing-tip jet nozzles 5.

A mass flow multiplying unit 6 is schematically illustrated, this unit having an outlet passage 7 connected with the conduit 1. Fluid from the unit will flow into the conduit 1 and be conducted by it and by branches 4 to the jet nozzles 2, 3 and 5. This fluid, issuing from the jet nozzles, will apply reactive forces which tend to move the aircraft in an upward direction. The present invention is directed to the mass flow multiplying unit 6.

Figure 2:
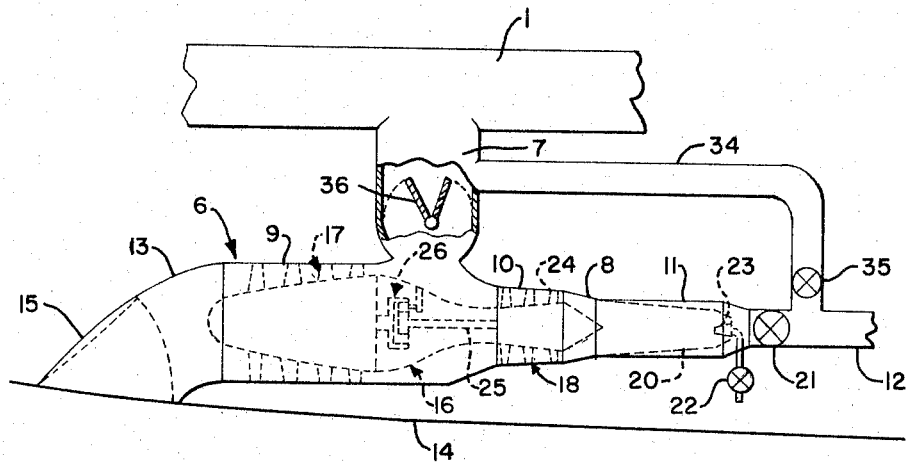
FIG. 2 is also a schematic view of an air mass flow multiplying apparatus formed in accordance with the present invention.

While the unit has been illustrated as applying to a hover control system for aircraft, it is obvious that the unit is adaptable to any other use requiring a large volume of air flow. The mass flow multiplying unit is shown schematically in FIG. 2. It is shown more in detail in FIG. 3 and an inspection of these figures will show that the unit includes a body constructed of suitable material to make a duct 8 having sections 9, 10, 11, and 12 of different diameters.

Section 12 of the duct provides a bleed air inlet at one end of the duct and an elbow section 13 provides an atmospheric air inlet at the other end of the duct. The duct is adapted to be arranged in the fuselage of the aircraft adjacent the lower portion thereof, section 13 of the atmospheric air inlet opening to the exterior of the aircraft fuselage at the skin line 14 thereof. The inlet 13 may be closed by a door 15 which will swing into the duct to admit atmospheric air when the mass flow multiplying unit is in operation. When the door 15 is closed, it coincides with and forms a continuation of the fuselage skin line. The duct receives a turbocompressor mechanism designated generally by the numeral 16, this mechanism having a compressor portion 17 disposed in the duct section 9 and a turbine portion 18 disposed in the duct section 10. The inlet to the compressor portion directly communicates with the atmospheric air inlet 13.

It will be noted that the outlet ends of the compressor and turbine portions face one another at the intermediate portion of the duct, this portion of the duct being in communication with the outlet passage 7. As previously pointed out, this passage communicates directly with the main conduit 1 of the hover control system.

The inlet end of the turbine portion 18 faces upstream of the duct and is arranged to receive gases discharged from a combustor 20 disposed in the section 11 of the duct. The inlet end of this section communicates via a valve 21 with the bleed air inlet formed by the section 12 of the duct. This bleed air inlet is connected by suitable passage means with a bleed air outlet of the gas turbine engine (not shown) or other prime mover of the aircraft.

A fuel inlet line 22 leads to a nozzle 23 located at the upstream end of the combustor for the purpose of mixing fuel with bleed air supplied to the bleed air inlet. Suitable ignition means may be provided to initially ignite the fuel when the operation of the device is started. As the fuel and air mixture burns in the combustor, gases will be produced, these gases being expanded as they flow through the turbine to impart rotary movement to one or more wheels 24 forming a part of the turbine. These wheels transmit rotary motion through a shaft 25 and gearing 26 to the rotor of the compressor 17. Rotary movement of this device draws air in through the atmospheric air inlet and discharges it to the outlet passage 7. The gases discharged from the turbine also mix with the compressor discharge and flow through the passage 7 to the hover control conduit 1. The operation of the device should be clear from the foregoing description. It will be summarized here, however, for the convenience of the reader.

Bleed air is introduced to the duct through the inlet 12. This bleed air is mixed with fuel and burned in the combustor 20, the gases of combustion flowing downstream to the turbine to effect rotation of the turbine wheels. This rotary movement is transmitted to the rotor of the compressor 17 which is operative to draw atmospheric air into the duct and discharge such air to the branch 7. The exhaust gases from the turbine also are admitted to the passage 7 to be mixed with the compressed air and supplied to the hover control conduit. It will be obvious that by mixing fuel with the bleed air, burning the mixture, and utilizing the resulting gases to drive a turbine which in turn operates a compressor, a considerably increased volume of air will be drawn into the device. By mixing this air and the exhaust gases from the turbine, a large mass of air may be supplied to the hover control conduit.

Figure 4:
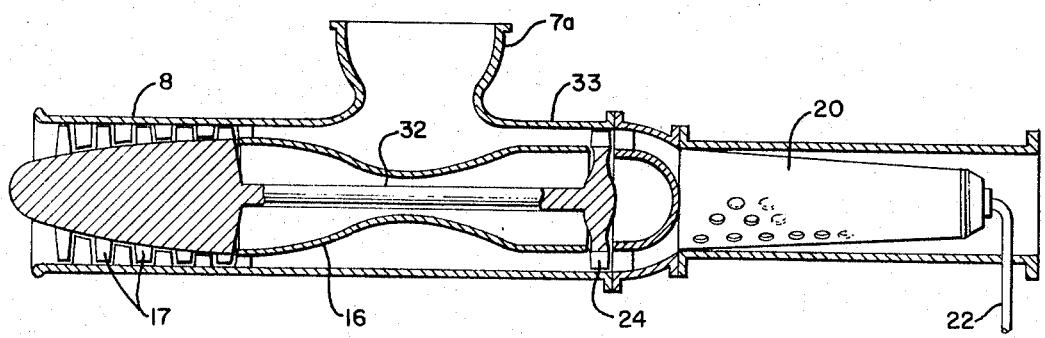
FIG. 4 is a similar view of a slightly modified form of unit.

As illustrated in FIG. 3, the mass flow multiplying mechanism includes a turbocompressor having a casing 27 which houses the compressor and the turbine as well as a transmission mechanism, assuming the latter is to be employed. This casing is streamlined and suitably shaped to facilitate the flow of gases and air. It is supported in the duct by strut elements 28 so that air and gases may flow around the casing from the inlets to the outlet 7. While axial flow compressor and turbine mechanisms are shown, it should be obvious that radial type units could be employed if desired. In FIG. 3 a gear transmission 26 has been illustrated in detail, this transmission connecting the turbine shaft 30 with the compressor rotor shaft 31. It should be apparent to one skilled in the art that the gear transmission might be omitted if a direct drive through a single shaft 32 between the turbine and the compressor is employed. FIG. 4 shows such a mechanism. In FIG. 4 the duct 33 of a slightly different shape, the portion receiving the turbine being substantially equal in diameter to that containing the compressor. This arrangement is provided because it is desired to use a larger diameter turbine. The apparatus shown in FIG. 4 is fundamentally the same as that shown in the previous form, a combustor being disposed between the turbine and the bleed air inlet. The outlet passage 7a communicates with the duct between the turbine and compressor to receive the exhaust flow from these portions and conduct the combined gases and air to the system for distribution to the points of use. The inlet to the compressor will communicate with an ambient air inlet as in the form first described.

To avoid the possibility of complete loss of jet thrust through the nozzles 2, 3 and 5, in the event the turbocompressor should become inoperative, a bypass passage 34 has been provided. The inlet to this pasage communicates with the bleed air inlet 12 and the outlet of such bypass communicates with the passage 7. Passage 34 is provided with a valve 35 which in the normal use of the mass flow multiplying unit is in a closed position. This bypass passage communicates with the duct 8 at the upstream side of the shutoff valve 21, the latter being normally in an open position during use of the unit. In the event the unit should become inoperative, valve 21 is closed and valve 35 opened. The bleed air introduced to the inlet 12 at this time may then flow through the bypass passage to the passage 7 for introduction to the main hover control air duct 1. Flow of such air at this time to the interior of the duct housing the turbocompressor will be prevented by a check valve 36 located in passage 7 adjacent the point of communication thereof with the duct 8. In the form of the invention shown, check valve 36 is of the split vane type, having sections pivotally mounted near the center of the passage 7 and movable from an open position shown in FIG. 2 to a closed position extending across the passage. Valves 21, 35 and 36 could, if desired, be electrically operated under the control of the pilot of the aircraft.

While the apparatus has been illustrated in but two similar forms, it is obvious that many changes may be made in the construction and relation of parts without departing from the spirit and scope of the invention.

We claim:
1. An air mass flow multiplying means comprising:
   (a) means forming a duct with inlets at opposite ends for receiving compressed air bled from an extraneous source and atmospheric air, and an outlet intermediate said ends; and
   (b) turbocompressor means in said duct, said turbocompressor means utilizing such bleed air to compress atmospheric air, the exhaust from the turbine portion of said turbocompressor means and said compressed air being delivered to said outlet.
2. Air mass flow multiplying means comprising:
   (a) means forming a duct having a plurality of fluid inlets at opposite ends to receive compressed air bled from an extraneous source and atmospheric air and an outlet intermediate said ends;
   (b) turbocompressor means disposed in said duct with the inlet of the turbine portion communicating with the bleed air inlet, the inlet of the compressor portion communicating with the atmospheric air inlet, and the exhausts of such portions communicating with said outlet, said turbine portion being in driving relation with said compressor portion; and
   (c) combustor means in said duct between said turbine portion and said bleed air inlet to receive bleed air from the latter inlet, mix fuel therewith and burn the mixture to provide gases of combustion for operating the turbine portion of said turbocompressor means.
3. Air mass flow multiplying means comprising:
   (a) means forming a duct having an inlet at one end adapted to receive bleed air from a remotely located engine and an atmospheric air inlet at the other end and an outlet intermediate said ends;
   (b) a compressor rotor supported for rotary movement in said duct between the atmospheric air inlet and said outlet;
   (c) a turbine rotor supported for rotary movement in said duct between said outlet and the first-mentioned inlet, said turbine rotor being in driving engagement with said compressor rotor; and

(d) combustor means in said duct between said turbine rotor and said first mentioned inlet.

4. Air mass flow multiplying means comprising:
(a) means forming a duct having an inlet at one end adapted to receive bleed air from a remotely located engine and an atmospheric air inlet at the other end and an outlet intermediate said said ends;
(b) a compressor rotor supported for rotary movement in said duct between the atmospheric air inlet and said outlet;
(c) a turbine rotor supported for rotary movement in said duct between said outlet and the first-mentioned inlet;
(d) a speed-changing, motion-transmitting means connecting said turbine and compressor rotors; and
(e) combustor means in said duct between said turbine rotor and said first-mentioned inlet.

5. Air mass flow multiplying means comprising:
(a) means forming a duct having an inlet at one end adapted to receive bleed air from a remotely located engine, an atmospheric air inlet at the other end, and an outlet intermediate said ends;
(b) a compressor rotor journalled in said duct between the atmospheric air inlet and said outlet;
(c) a turbine rotor journalled in said duct between the bleed air inlet and said outlet;
(d) a speed-changing, motion-transmitting means connecting said turbine and compressor rotors; and
(e) combustor means in said duct between said turbine rotor and said bleed air inlet.

6. Air mass flow multiplying means comprising:
(a) means forming a duct having an atmospheric air inlet at one end, an inlet at the other end adapted to receive bleed air from a remotely located engine, and an outlet intermediate said ends, said duct being larger in cross-sectional area between said outlet and said atmospheric air inlet than the cross-sectional area between said outlet and said bleed air inlet;
(b) a compressor rotor journalled in the duct portion of larger cross-sectional area;
(c) a turbine rotor journalled in the duct portion of smaller cross-sectional area;
(d) a driving connection between said turbine rotor and said compressor rotor; and
(e) combustor means in said duct between said turbine rotor and said bleed air inlet.

7. Air mass flow multiplying means comprising:
(a) means forming a duct having an atmospheric air inlet at one end, a bleed air inlet at the other end, and an outlet branch communicating with said duct intermediate said ends;
(b) turbocompressor means in said duct, the turbine portion of such means being disposed between said outlet and said bleed air inlet, the compressor portion of such means being disposed between said outlet and said atmospheric air inlet, the exhausts from said turbine and compressor portions communicating with said outlet branch, said turbine portion being in driving relation with said compressor portion;
(c) combustor means in said duct between said turbine rotor and said bleed air inlet;
(d) bypass duct means extending from said duct upstream of said combustor means to said outlet branch;
(e) valve means for controlling flow through said bypass duct; and
(f) valve means in said duct between said combustor means and the point of communication of said bypass duct with said duct.

8. Air mass flow multiplying means comprising:
(a) means forming a duct having an atmospheric air inlet at one end, a bleed air inlet at the other end, and an outlet branch communicating with said duct intermediate said ends;
(b) turbocompressor means in said duct, the turbine portion of such means being disposed between said outlet and said bleed air inlet, the compressor portion of such means being disposed between said outlet and said atmospheric air inlet, the exhausts from said turbine and compressor portions communicating with said outlet branch, said turbine portion being in driving relation with said compressor portion;
(c) combustor means in said duct between said turbine rotor and said bleed air inlet;
(d) bypass duct means extending from said duct upstream of said combustor means to said outlet branch;
(e) valve means for controlling flow through said bypass duct;
(f) valve means in said duct for interrupting flow from said bleed air inlet to said combustor; and
(g) check valve means in said outlet branch for preventing flow from said branch into said duct.

9. Air mass flow multiplying means comprising:
(a) means forming a duct having an atmospheric air inlet at one end, a bleed air inlet at the other end, and an outlet branch communicating with said duct intermediate said ends;
(b) turbocompressor means in said duct, the turbine portion of such means being disposed between said outlet and said bleed air inlet, the compressor portion of such means being disposed between said outlet and said atmospheric air inlet, the exhausts from said turbine and compressor portions communicating with said outlet branch, said turbine portion being in driving relation with said compressor portion;
(c) combustor means in said duct between said turbine rotor and said bleed air inlet;
(d) bypass duct means extending from said duct upstream of said combustor means to said outlet branch;
(e) valve means for controlling flow through said bypass duct;
(f) valve means in said duct for interrupting flow from said bleed air inlet to said combustor;
(g) check valve means in said outlet branch for preventing flow from said branch into said duct; and
(h) means for closing said atmospheric air inlet to said duct.

10. In an aircraft of the type having an outer skin line, air mass flow multiplying means comprising:
(a) means forming a duct having an atmospheric air inlet at one end, such inlet coinciding with the outer skin line of the aircraft, an inlet at the other end of said duct adapted to receive bleed air from a remotely located engine, and an outlet intermediate the ends of said duct;
(b) turbocompressor means in said duct, the turbine portion of such means being disposed between said outlet and said bleed air inlet, the compressor portion of such means being disposed between said outlet and said atmospheric air inlet, the exhausts from said turbine and compressor portions communicating with said outlet, said turbine portion being in driving relation with said compressor portion;
(c) combustor means in said duct between said turbine rotor and said bleed air inlet; and
(d) means for closing said atmospheric air inlet to said duct, said means being flush with and constituting a continuation of said outer skin line when closed and capable of moving to an open position to admit atmospheric air to said duct.

11. In an aircraft of the type having main and branch hover control air ducts leading to jet nozzle outlets, means for supplying air to such ducts comprising:
(a) means forming a duct having an atmospheric air inlet at one end, an inlet at the other end adapted to receive bleed air from a remotely located engine, and an outlet branch connecting the intermediate portion of said duct with the main hover control air duct;

(b) turbocompressor means in said duct, the turbine portion of such means being disposed between said outlet and said bleed air inlet, the compressor portion of such means being disposed between said outlet and said atmospheric air inlet, the exhausts from said turbine and compressor portions communicating with said outlet branch, said turbine portion being in driving relation with said compressor portion; and (c) combustor means in said duct between said turbine rotor and said bleed air inlet.

12. In an aircraft of the type having main and branch hover control air ducts leading to jet nozzle outlets, means for supplying air to such ducts comprising:

(a) means forming a duct having an atmospheric air inlet at one end, a bleed air inlet at the other end, and an outlet branch connecting the intermediate portion of said duct with the main hover control air duct;

(b) turbocompressor means in said duct, the turbine portion of such means being disposed between said outlet and said bleed air inlet, the compressor portion of such means being disposed between said outlet and said atmospheric air inlet, the exhausts from said turbine and compressor portions communicating with said outlet branch, said turbine portion being in driving relation with said compressor portion;

(c) combustor means in said duct between said turbine rotor and said bleed air inlet; and (d) means for conducting bleed air directly to said main hover control air duct when said turbocompressor means is inoperative.

13. Air mass flow multiplying means comprising:

(a) means forming a duct having an atmospheric air inlet at one end, an inlet at the other end adapted to be connected with a bleed air outlet of a remotely located engine to receive bleed air therefrom, and an outlet intermediate said ends;

(b) turbocompressor means in said duct, the turbine portion of such means being disposed between said outlet and said bleed air inlet, the compressor portion of such means being disposed between said outlet and said atmospheric air inlet, said turbine portion being in driving relation with said compressor portion; and (c) fuel combustor means in said duct between said turbine and said bleed air inlet, said combustor means receiving bleed air from said inlet and discharging gases of combustion to said turbine portion.

14. Air mass flow multiplying means comprising:

(a) means forming a duct having an atmospheric air inlet at one end, a bleed air inlet at the other end, and an outlet branch communicating with said duct intermediate said ends;

(b) turbocompressor means in said duct, the turbine portion of such means being disposed between said outlet and said bleed air inlet, the compressor portion of such means being disposed between said outlet and said atmospheric air inlet, the exhausts from said turbine and compressor portions communicating with said outlet branch, said turbine portion being in driving relation with said compressor portion;

(c) combustor means in said duct between said turbine rotor and said bleed air inlet;

(d) bypass duct means extending from said duct upstream of said combustor means to said outlet branch; and (e) valve means operative to cause bleed air to flow from said inlet directly to said outlet branch and bypass said combustor and turbine.

15. Lift augmenting apparatus for aircraft comprising:

(a) a manifold duct communicating with remotely located jet nozzles;

(b) means communicating with said manifold duct for supplying fluid under pressure thereto, said means having a duct with an atmospheric air inlet at one end, an inlet at the other end adapted to communicate with a bleed air outlet of a remotely located engine to receive bleed air therefrom, and an intermediate outlet connected with said manifold duct; and (c) turbocompressor means in said duct, said turbocompressor means utilizing the engine bleed air to compress atmospheric air, combine it with exhaust gases, and discharge the same to said outlet to supply fluid under pressure to said manifold.

References Cited by the Examiner

UNITED STATES PATENTS

| | | | |
|---|---|---|---|
| 2,168,726 | 8/1939 | Whittle | 60—35.6 |
| 2,796,732 | 6/1957 | Penn | 60—39.07 |
| 2,870,978 | 1/1959 | Griffith et al. | 244—52 |
| 2,926,732 | 3/1960 | Chamberlin | 60—39.16 |
| 3,099,422 | 7/1963 | Madelung | 60—35.6 |
| 3,117,747 | 1/1964 | Creasey | 244—12 |

MARK NEWMAN, *Primary Examiner.*

D. HART, *Assistant Examiner.*